UNITED STATES PATENT OFFICE.

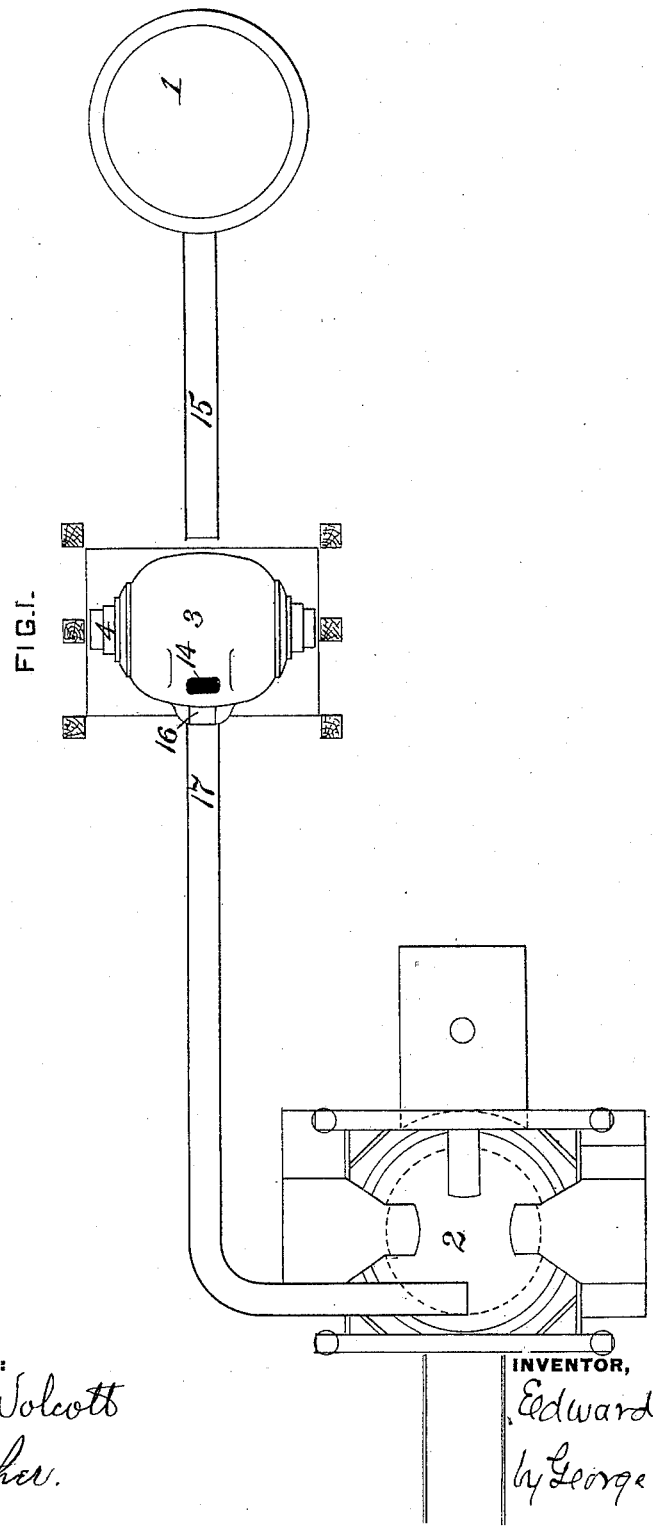

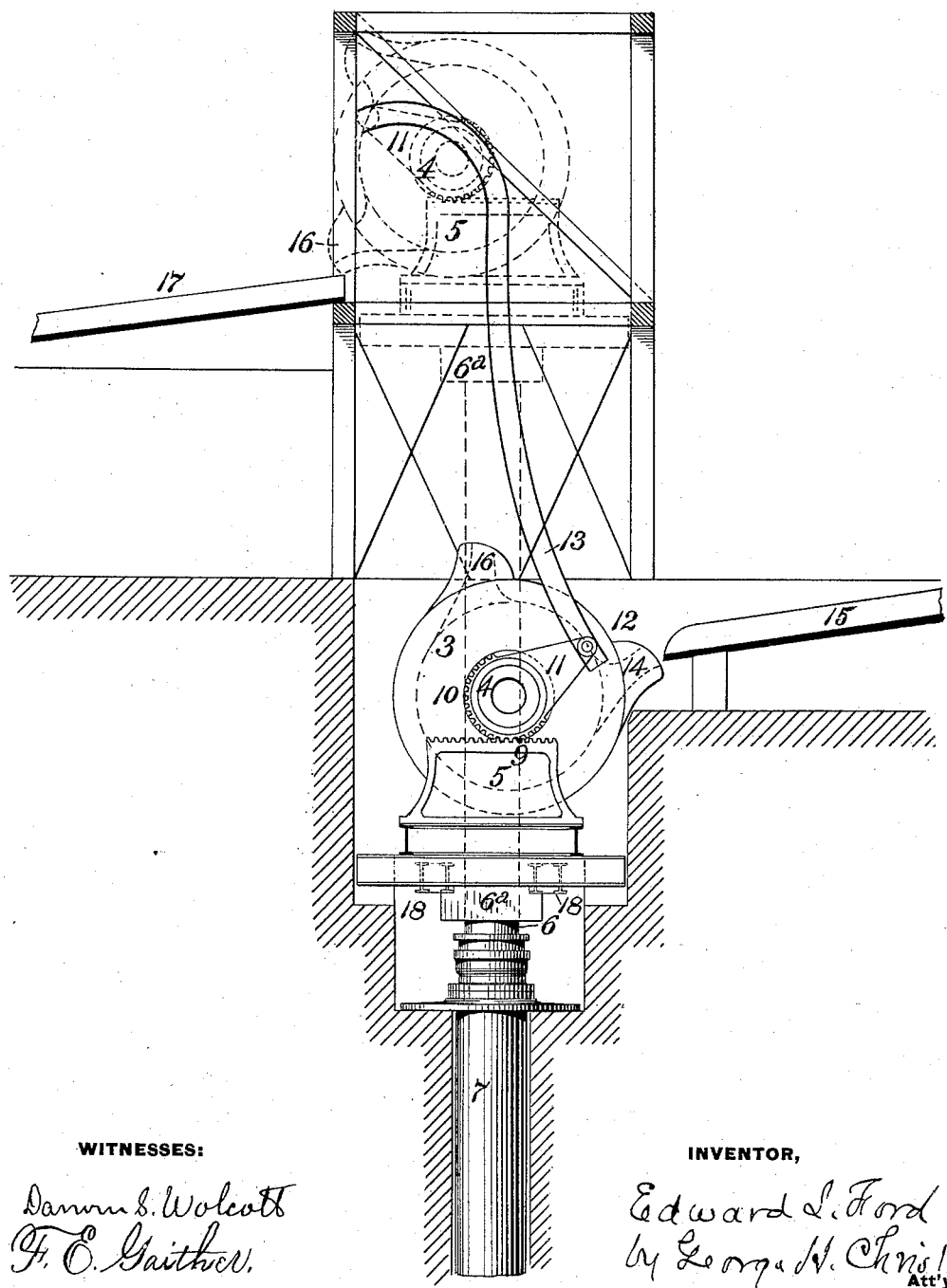

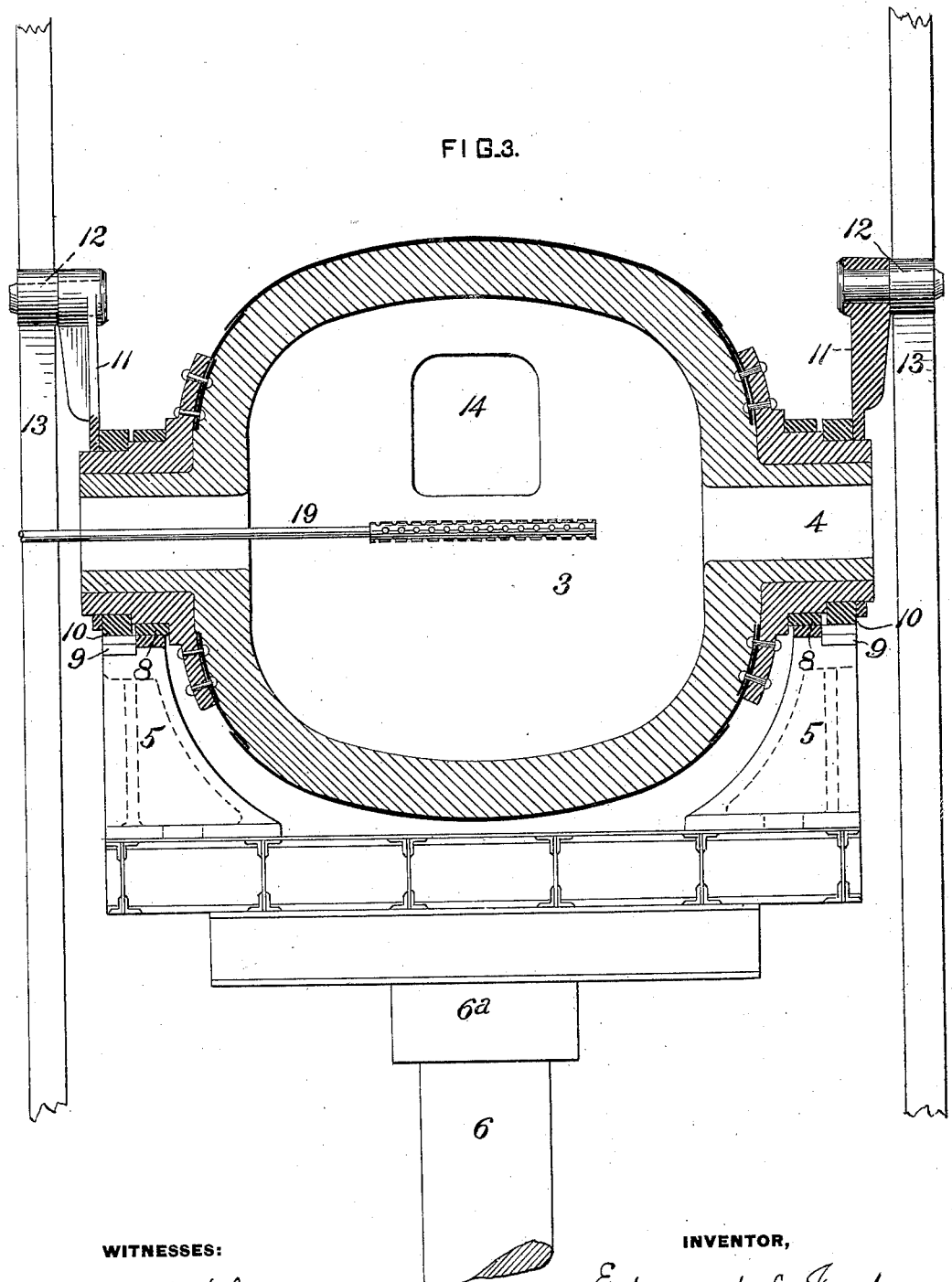

EDWARD L. FORD, OF YOUNGSTOWN, OHIO.

METALLURGICAL PLANT.

SPECIFICATION forming part of Letters Patent No. 468,533, dated February 9, 1892.

Application filed December 9, 1890. Serial No. 374,053. (No model.)

*To all whom it may concern:*

Be it known that I, EDWARD L. FORD, a citizen of the United States, residing at Youngstown, in the county of Mahoning and State of Ohio, have invented or discovered certain new and useful Improvements in Metallurgical Plants, of which improvements the following is a specification.

The invention described herein relates to certain improvements in a plant for the production of refined metal and for other metallurgical operations. It is necessary in some metallurgical operations—such as refining pig metal in the Pernot furnace or the manufacture of Bessemer metal—to melt the pig metal before it is charged into the refining-furnace, and under the term "refining-furnace" is included the Pernot furnace, the Bessemer converter, the open-hearth furnace, or other refining or converting furnace or vessel. The molten metal for charging the refining-furnace has been drawn from the blast-furnace or from a melting-furnace; but on account of the difference of time required for melting and refining, and for the reason that the charge drawn from the blast-furnace is too large for the refining-furnace, it is customary to employ a storage-tank, into which the molten metal is run and subsequently charged in suitable quantities into the refining-furnace. In employing these storage tanks or vessels two arrangements of plant have been necessary—one wherein the blast or melting furnace, the storage-tank, and the refining-furnace are arranged on different levels, the blast or melting furnace being the highest, and suitable troughs are provided for conducting the metal along through the series. In the other arrangement the blast or melting furnace, storage-tank, and refining-furnace are on approximately the same level and movable ladles are of necessity employed for transferring the molten metal. The cost of erecting and operating the plant first described is practically prohibitive, and the second arrangement is also costly and difficult of maintenance and operation on account of the employment of ladles and their transferring mechanisms.

The object of this invention is to provide for the employment of troughs for transferring the molten metal when the blast or melting furnace and the refining-furnace are on approximately the same level or the refining-furnace is on a higher level than the blast-furnace; and, in general terms, the invention consists in the construction and arrangement of the several devices or elements, all as more fully hereinafter described and claimed.

In the accompanying drawings, forming a part of this specification, Figure 1 is a plan view of a plant embodying my invention. Fig. 2 is a sectional elevation, the storage-tank, and its operating mechanism; and Fig. 3 is a sectional view of the storage-tank on an enlarged scale, the section being taken through the axis of the tank.

In the practice of my invention the blast-furnace 1 and refining-furnace 2, which in this case is a furnace of the Pernot type, are arranged in any desired relation to and at any suitable distance from each other. At any suitable point such that the molten metal can be conducted to and from it is placed the storage-tank 3. This tank, preferably barrel shape in contour, is made of plate metal and is lined with some suitable refractory material. Trunnions 4, secured to the ends of the tank, rest upon pedestals 5, which are fixed upon I-beams arranged to form a platform and supported by the head 6ª of the plunger 6 of the hydraulic ram 7. As stated, the trunnions 4 rest upon the pedestals 5, whose bearing-faces 8 are made of a length proportional to the progressive as distinguished from the rotative movement of the trunnions, the latter being also proportioned as regards their circumference to the progressive movement of the tank from receiving to discharging position. Alongside of the bearing-faces 8 are formed rack-bars 9, with which curved rack-bars 10, secured on the trunnions, engage, thereby effecting a progressive movement of the trunnions when rotated. On the trunnions are secured arms 11, provided at their outer ends with friction-rollers 12, engaging camways 13, secured to the frame-work surrounding the tank. These camways are so constructed as regards their lower portions as to shift and hold the tank that the receiving-spout 14 thereof will be below and slightly in under the discharge end of the trough 15, extending from the tap-hole of the blast or melting furnace, as shown in Fig. 1, when the tank is at the lower limit of its vertical movement. As the tank is raised from the lower position the shape of the camway is such that the tank is turned toward the left until the receiving and discharging spouts are in approximately the same horizontal plane. The tank is held in such position while being raised until near the upper limit of its movement, when it is gradually turned to the left by the camway operating through the arms 11. During this rotation to the left the trunnions roll along the bearing-faces of the pedestals, thereby imparting a progressive movement of the tank to the left. The upper portions of the camways are so shaped that by the time the tank has nearly reached the upper limit of its movement the discharging-spout 16 will be above and over the receiving end of the trough 17, leading to the refining-furnace 2. After the tank has reached this position further upward movement will cause a further rotation of the tank, so as to cause the molten metal to flow out through the spout 16, as shown in dotted lines in Fig. 2. In lowering the tank a reverse rotation and retrograde movement is imparted thereto by the camway until the tank is in the position shown in full lines in Fig. 2, ready for the reception of molten metal from the blast or melting furnace.

In Fig. 2 are shown beams 18, upon which the platform carrying the tank will rest when lowered a little below the position shown in Fig. 2. As the plunger of the hydraulic cylinder is not attached to the platform of the tank, it may be lowered away therefrom, thereby transferring the weight of the tank and its contents to the beams 18, which form the platform or supporting portion of suitable scales, whereby the amount of metal added to and taken from the tank can be ascertained.

As shown in Fig. 3, the trunnions of the tank are made hollow, so as to permit of the passage of a gas-pipe 19 into the tank, said pipe being provided with a suitable burner. While in the ordinary operation of the plant the metal in the tank will remain in a molten condition, the metal may be kept hot by burning gas within the tank.

It will be readily understood that by the employment of a vertically-movable receptacle in connection with a trough or troughs the relative heights of the tap-hole of the blast or melting furnace and the charging-opening of the refining-furnace are immaterial. As, for example, if the charging-opening of the refining-furnace is on the same level or higher than the tap-hole of the blast-furnace the tank can be lowered until there will be sufficient fall to cause the metal to flow into it from the blast-furnace, and then raised until the molten metal will flow thence into the refining-furnace. If, on the contrary, the tap-hole of the blast or melting furnace is so high relative to the charging-opening of the refining-furnace that the metal will flow too rapidly and with too great force into the latter, the molten metal may be run into the tank in an elevated position and the tank then lowered until the difference of level between its pouring-spout and the charging-opening of the refining-furnace is such that the metal will flow gently into the latter.

Vessels or tanks heretofore employed for holding or transferring molten metal have been so constructed as to present considerable resistance to any movement from normal position, and when shifted to be in a state of unstable equilibrium, requiring considerable force to retain them in a position other than normal. The vessel or tank is of a shape or contour corresponding to that of a body of revolution, so that its center of gravity and that of the contained metal will always be in the same relative position to the axis of rotation. In other words, the shape of the vessel is such that when empty its center of gravity will coincide with its axis of rotation. The only resistance to its rotation is that due to the friction of its trunnions upon their supports and of the molten metal against the walls of the tank; and, further, there is no tendency when shifted to change its position.

I claim herein as my invention—

1. The combination of a blast or melting furnace, a refining-furnace, troughs connecting said furnaces, a tank interposed in the line of said troughs, and mechanism for moving the tank vertically and simultaneously rotating the tank to receive and discharge the molten metal, substantially as set forth.

2. The combination of a blast or melting furnace, a refining-furnace, troughs connecting said furnaces, a tank having receiving and charging spouts interposed in the line of said troughs, and mechanism for imparting a simultaneous vertical, rotary, and progressive movement to the tank, whereby the receiving-spout may be moved under the end of the trough from the blast-furnace and the charging-spout over the receiving end of the trough leading to the refining-furnace, substantially as set forth.

3. In a metallurgical plant, the combination of a vertically-movable platform provided with pedestals, a tank provided with trunnions resting on and adapted to turn or roll on said pedestals, camways, and arms secured to the trunnions and engaging the camways, whereby the tank may be rotated during its vertical movements, substantially as set forth.

4. In combination with a blast or melting furnace, a refining-furnace, troughs connecting said furnaces, a tank or vessel interposed in the line of said troughs, and means for imparting a rolling or conjoint rotary and progressive movement to the tank to receive and discharge the molten metal during its transfer from one furnace to the other, said tank having the shape of a body of revolution, so that its center of gravity and that of the contained metal will be in the same position relative to the axis of rotation in all positions of the vessel or tank, substantially as set forth.

5. In a metallurgical plant, the combination of a blast or melting furnace, a refining-furnace, troughs connecting said furnaces, a tank or vessel provided with trunnions interposed in the line of said troughs and having the shape of a body of revolution, so that its center of gravity and that of the contained metal will be in the same position relative to the axis of rotation in all positions of the tank, supports or pedestals for the trunnions, the diameters of the trunnions and the length of the bearing-faces of the pedestals being proportional to the forward or backward movement to be imparted to the vessel or tank, and means for rotating the tank or vessel, substantially as set forth.

6. In a metallurgical plant, the combination of a blast or melting furnace, a refining-furnace, troughs connecting said furnaces, a tank or vessel provided with trunnions interposed in the line of said trough and having the shape of a body of revolution, so that its center of gravity and that of the contained metal will be in the same position relative to the axis of rotation in all positions of the tank, vertically-movable supports or pedestals for the trunnions, the diameters of the trunnions and the lengths of the bearing-faces of the pedestals being proportional to the forward or backward movement to be imparted to the tank, and means for rotating the tank or vessel, substantially as set forth.

7. In a metallurgical plant, the combination of a blast or melting furnace, a refining-furnace, troughs connecting said furnaces, a movable tank or vessel provided with trunnions and having the shape of a body of revolution, so that its center of gravity and that of the contained metal will be in the same position relative to the axis of rotation in all positions of the tank, and vertically-movable supports or pedestals for the trunnions, the diameters of the trunnions being proportional to the forward or backward movement to be imparted to the vessel or tank, substantially as set forth.

In testimony whereof I have hereunto set my hand.

EDWARD L. FORD.

Witnesses:
W. R. MERRICK,
TOD FORD.